United States Patent
Case et al.

(10) Patent No.: US 9,954,681 B2
(45) Date of Patent: Apr. 24, 2018

(54) SYSTEMS AND METHODS FOR DATA ENCRYPTION

(71) Applicant: FREESCALE SEMICONDUCTOR, INC., Austin, TX (US)

(72) Inventors: Lawrence L. Case, Austin, TX (US); Charles E. Cannon, Austin, TX (US); Mingle Sun, Shanghai (CN); Thomas E. Tkacik, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/735,724

(22) Filed: Jun. 10, 2015

(65) Prior Publication Data

US 2016/0364343 A1 Dec. 15, 2016

(51) Int. Cl.
| | |
|---|---|
| H04L 9/08 | (2006.01) |
| G06F 21/80 | (2013.01) |
| G06F 21/78 | (2013.01) |
| G06F 21/76 | (2013.01) |
| G06F 21/72 | (2013.01) |
| H04L 9/06 | (2006.01) |
| G06F 21/60 | (2013.01) |
| H04L 29/06 | (2006.01) |

(Continued)

(52) U.S. Cl.
CPC ............ *H04L 9/0894* (2013.01); *G06F 21/60* (2013.01); *G06F 21/72* (2013.01); *G06F 21/76* (2013.01); *G06F 21/78* (2013.01); *G06F 21/79* (2013.01); *G06F 21/80* (2013.01); *G09C 1/00* (2013.01); *H04L 9/0618* (2013.01); *H04L 9/0637* (2013.01); *H04L 9/088* (2013.01); *H04L 9/0816* (2013.01); *H04L 63/0853* (2013.01); *H04L 2209/12* (2013.01)

(58) Field of Classification Search
CPC .......... G06F 21/72; G06F 21/78; G06F 21/60; G06F 21/76; G06F 21/80; H04L 9/0816; H04L 9/0618; H04L 63/0853; H04L 9/0637; H04L 9/0894; H04L 9/088
See application file for complete search history.

(56) References Cited

U.S. PATENT DOCUMENTS

| | | | |
|---|---|---|---|
| 6,847,609 B1 * | 1/2005 | Sarnikowski | H04L 41/0803 370/229 |
| 7,181,541 B1 * | 2/2007 | Burton | H04L 49/90 370/463 |

(Continued)

OTHER PUBLICATIONS

J. C. Lyke, C. G. Christodoulou, G. A. Vera and A. H. Edwards, "An Introduction to Reconfigurable Systems," in Proceedings of the IEEE, vol. 103, No. 3, pp. 291-317, Mar. 2015.*

(Continued)

*Primary Examiner* — Kari Schmidt

(57) ABSTRACT

A method of encrypting data on a memory device includes receiving a memory transaction request at an inline encryption engine coupled between a processing core and switch fabric in a system on a chip (SOC). The memory transaction request includes a context component and a data component. The context component is analyzed to determine whether the data component will be stored in an encrypted memory region. If the data component will be stored in an encrypted memory region, the data component is encrypted and communicated to a location in the encrypted memory region. The location is based at least on the context component.

19 Claims, 9 Drawing Sheets

(51) Int. Cl.
*G09C 1/00* (2006.01)
*G06F 21/79* (2013.01)

(56) References Cited

U.S. PATENT DOCUMENTS

| | | | | |
|---|---|---|---|---|
| 7,334,125 B1* | 2/2008 | Pellacuru | ................ | H04L 9/083 |
| | | | | 380/277 |
| 7,434,069 B2 | 10/2008 | Nessler | | |
| 8,639,627 B2 | 1/2014 | Schnell et al. | | |
| 9,256,551 B2* | 2/2016 | Paaske | ................ | G09C 1/00 |
| 2005/0268032 A1* | 12/2005 | Sikdar | ................ | G06F 17/302 |
| | | | | 711/114 |
| 2006/0095793 A1* | 5/2006 | Hall | ................ | G06F 12/145 |
| | | | | 713/190 |
| 2009/0172416 A1* | 7/2009 | Bosch | ................ | H04L 9/0643 |
| | | | | 713/193 |
| 2010/0299537 A1* | 11/2010 | Mackey | ................ | G06F 12/1408 |
| | | | | 713/190 |
| 2011/0296201 A1* | 12/2011 | Monclus | ................ | G06F 21/53 |
| | | | | 713/190 |
| 2013/0266137 A1 | 10/2013 | Blankenbeckler et al. | | |
| 2013/0301522 A1 | 11/2013 | Krishna et al. | | |
| 2014/0089617 A1* | 3/2014 | Polzin | ................ | G06F 12/14 |
| | | | | 711/163 |
| 2014/0281529 A1* | 9/2014 | Epp | ................ | H04L 63/0428 |
| | | | | 713/168 |
| 2014/0310536 A1* | 10/2014 | Shacham | ................ | G06F 21/78 |
| | | | | 713/193 |
| 2015/0248568 A1* | 9/2015 | Offenberg | ................ | G06F 21/6218 |
| | | | | 713/193 |
| 2015/0294117 A1* | 10/2015 | Cucinotta | ................ | G06F 21/74 |
| | | | | 713/189 |
| 2016/0092702 A1* | 3/2016 | Durham | ................ | G06F 21/72 |
| | | | | 713/190 |
| 2016/0149781 A1 | 5/2016 | Andreescu | | |
| 2016/0179702 A1* | 6/2016 | Chhabra | ................ | G06F 12/1408 |
| | | | | 713/193 |
| 2016/0182223 A1* | 6/2016 | Kishinevsky | ................ | H04L 9/0631 |
| | | | | 380/28 |

OTHER PUBLICATIONS

Shi, Weidong, et al. "Architectural support for high speed protection of memory integrity and confidentiality in multiprocessor systems." Proceedings of the 13th International Conference on Parallel Architectures and Compilation Techniques. IEEE Computer Society, 2004. pp. 123-134.*

\* cited by examiner

SYSTEMS AND METHODS FOR DATA ENCRYPTION

BACKGROUND

Field

This disclosure relates generally to semiconductor processing devices, and more specifically, encrypting or decrypting (ciphering) data in memory to a system-on-a-chip device.

Related Art

Inline encryption is the method of encrypting or decrypting (ciphering) data as it transfers on a bus. Double data rate (DDR) SDRAM inline encryption engines are dedicated to an external port so the memory available for ciphering from that single encryption engine is limited to DRAM. Inline encryption of other memories, volatile or non-volatile, require additional dedicated engines. Encrypted data for external storage in an inline process may be cryptographically bound to a chip and addresses but not to the encryption mode used for a given region of memory and not to the originating process and associated resources (i.e. resource domain). Different uses of encrypted data can require different encryption modes for security and performance reasons. For instance, non-volatile data used for on-the-fly decryption may be restricted to decryption from memory to the core only, in a specific advanced encryption standard (AES) counter cipher mode while data stored in DDR may use a strong but slower AES-XEX-based Tweaked Code Book mode with CipherText Stealing (XTS) mode.

Traditional cryptographic bindings do not take into account the resource's domain identity. A resource domain controller in a data processing system includes information that groups various resources, such as bus masters and peripherals, into common domains. Each group can be referred to as a resource domain and can include one or more data processor and peripheral devices. The resource domain information, therefore, assigns data processors and peripherals of a data processing system to one or more resource domains. Multiple and mutually suspicious processes on the same chip originating from distinct resource domains execute, transfer, or store security-sensitive data to the same external memory or bus. In traditional inline encryption techniques, a process' external data is only cryptographically protected from the other resource domains by address. Traditional resource domain bindings require internal memory for secure storage which is more likely to be synchronized for address-based separation. An external device where the ciphered data resides may be out of synchronization in terms of address assignment from internal management processes due to power, clock, reset, etc . . . and therefore subject to malicious or inadvertent exposure across resource domains. Therefore cryptographically binding addresses is not sufficient to protect data between the on chip processes when data is stored external to the chip.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods are disclosed that provide flexibility to perform inline encryption to multiple memory locations on a device such as a multi-core system on a chip with multiple resource domains. Transactions to encrypted memory regions are as transparent to the bus master as transactions to un-encrypted memory. Secure encrypted storage is available for multiple but isolated processing domains without need for software overhead at the time of the data transaction. Cryptographic keys, modes, and an associated context component to protect each domain's information are automatically selected based on resource domain and address. Transaction routing and data encryption are automatically handled when a memory transaction request addresses encrypted regions in the system memory map.

Figure 1:
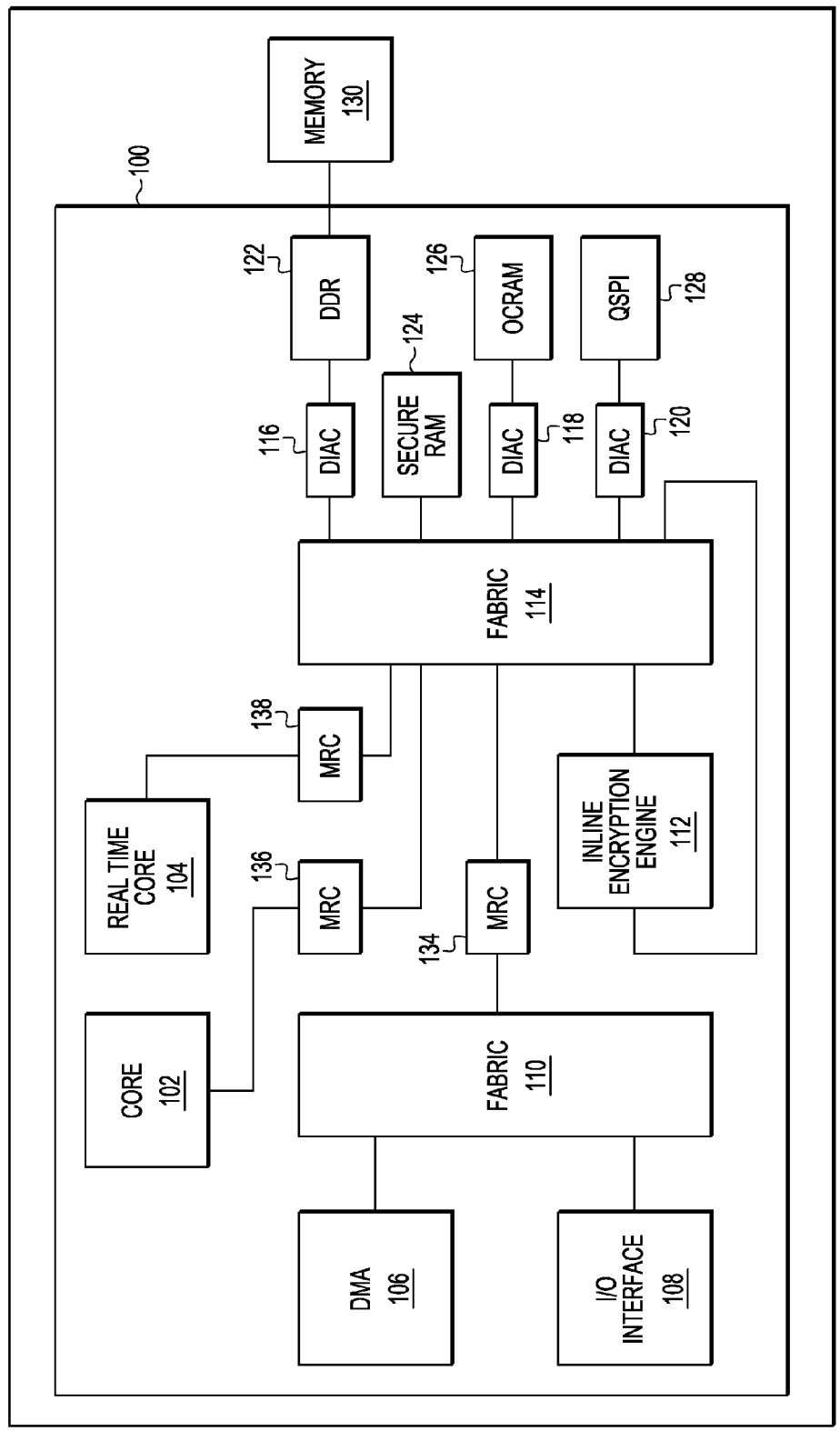
FIG. 1 is a block diagram of an embodiment of a system-on-a-chip (SOC) including an inline encryption engine.

FIG. 1 is a block diagram of an embodiment of a system-on-a-chip (SOC) 100 including one or more processing cores 102 (referred to as a "multi-core" SOC), real-time processing core 104, direct memory access (DMA) interface 106, input/output (I/O) interface 108, switch fabric or bus interconnect 110, one or more inline encryption engines 112, switch fabric 114, double data rate (DDR) DRAM interface 122, on-chip RAM (OCRAM) 126, and queued serial peripheral interface (QSPI) 128. SOC 100 is coupled to external memory, including DDR interface 122 coupled to DRAM 130 and QSPI 128 coupled to flash memory 132.

Core 102 and real-time core 104 are coupled to communicate with switch fabric 114 via respective memory region controllers (MRCs) 136, 138. DMA interface 106 and I/O interface 108 are coupled to communicate with switch fabric 110. Switch fabric 110 is coupled to communicate with fabric 114 via MRC 134. MRCs 134, 136, 138 are modules on a respective bus that control access to address ranges (regions) in the system memory map. Memory regions are configured by a trusted execution environment to allow or deny access to resource domains. Additionally, MRCs 134-138 detect memory regions to hold encrypted data and create an additional routing bit or bits on the address bus. Also the MRC sends cryptographic context information on user-defined bus signals that IEE 112 uses to determine which mode, keys and context to use for a transaction. Context information can include a domain identifier, a logical domain, algorithm, encryption mode, crypto key, an address, a resource domain, a privilege, and/or a security state, among other information. MRCs 134-138 can be on all input busses that may use the IEE. Various privilege levels may be implemented in SOC 100 to control access to various instructions, resources, or regions of memory in SOC 100 only by users having a required level of permission.

Inline encryption engine (IEE) 112 has an output coupled to an input of switch fabric 114 and an output of switch fabric 114 is coupled to an input of IEE 112. Another output of switch fabric 114 is coupled to an input to secure RAM 124. Another output of switch fabric 114 is coupled to an input to OCRAM 126. Another output of switch fabric 114 can be coupled to an input to QSPI 128. An output of DDR DRAM interface 122 is coupled to an input of DRAM 120 and an output of QSPI 128 is coupled to an input to flash memory 132. More than one IEE 112 can be included in SOC 100, and IEEs 112 can be configured differently from one another. For example, some IEEs 112 can be sized to handle less data than others to save space, some IEEs 112 can handle read transactions and others may just handle write transactions (tend to do more reads). One or more different IEEs 112 can be dedicated to a particular domain, different cipher algorithms, etc.

The connections between components in SOC 100 can be implemented with one or more suitable communication buses, such as an Advanced eXtensible Interface (AXI), an Advanced High-performance bus (AHB), or other suitable bus(es), or a combination thereof. As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Secure RAM 124 is used to store overflow data that is queued for encryption. Input first-in first-out (FIFO) transaction information is redirected to the secure RAM 124 temporarily until IEE 112 is able to handle the data. Just before the IEE 112 is ready to process the data, a prefetch direct memory access can retrieve the data from secure RAM 124. Secure RAM 124 can clear itself if unauthorized access of data is attempted. OCRAM 126 is local or internal to SOC 100 and may be used as cache memory and/or for other suitable purposes. DRAM 130 can be any double data rate synchronous dynamic RAM (DDR SDRAM or DDR1, SDRAM, DDR2 SDRAM, DDR3, DDR4 etc.) devices and the like, although alternative types of memory devices may be used with a corresponding memory interface, such as single data rate (SDR) SDRAM devices, directly addressable external RAM, bubble memory, and NOR flash memory, among others.

In operation, cores 102, 104 execute instructions, whereby instruction data and operand data can be accessed in OCRAM 126, DRAM 130, flash memory 132, via I/O interface 108, or another source. Data resulting from the execution of the instructions can be provided for storage in OCRAM 126, DRAM 130, or flash memory 132, or provided to DMA interface 106, I/O interface 108, or other component.

Switch fabric 110 enables communication between peripheral devices, such as serial rapid input/output (SRIO), PCI express, and other I/O peripherals and also enables communication between the peripheral devices and to other portions of system 100 by way of switch fabric 114. Also, DMA interface 106 may direct data transfers between peripherals by way of switch fabric 110 and between peripherals and devices coupled to switch fabric 114. The peripheral device interfaces are exemplary only and it is understood that other types of peripherals and I/O devices may be used with SOC 100.

IEE 112 is designed for use in heterogeneous multi-core, multi-privilege SOCs 100 where processes from identifiably different cores or resource domains 102, 104 and/or privilege levels may need to secure data stored in external memory 130, 132 and from the other software of a different domain or privilege level on the same chip. A privilege level in one resource domain does not necessarily have that same privilege level in another domain. IEE 112 is also designed to efficiently encrypt data for secure storage on multiple ports on the same SOC 100. One IEE 112 can be used by several cores 102, 104 to store encrypted data on several memory devices 126, 130, 132.

IEE 112 can be used in multi-core or multi-privilege SOCs 100 where processes from identifiably different core domains or privilege levels may need to secure data from external access and from the other software of different domain or privilege levels on the same SOC 100. IEE 112 is also designed to be efficient in use of encryption logic for secure storage on multiple ports on the same SOC 100. One IEE 112 can be used by several cores 102, 104 to store encrypted data on several memories 130, 132 and via different I/O interfaces 106, 108.

Upon initial configuration out of reset crypto keys and permissions can be established. There may be long term keys which can be restored and ephemeral keys that are lost between power cycles or upon tamper. Non-volatile memories such as flash memory 132 may require a non-volatile key, volatile memories 130 may require a random key generated for each power cycle. The cipher modes allowed for each memory region can be programmable via software. Regions for R/W access may use AES-XTS encryption. Regions of Read-Only memory may use the AES-CTR mode for efficient parallel key generation while data is fetched from a high latency memory. IEE 112 is not restricted to AES, nor to XTS and CTR modes. Other encryption modes could be used for other purposes. An encryption mode portion of an encryption context can be determined by both a resource domain identifier and memory region. An IEE encryption mode, IEE instance selection (when multiple IEEs 112 reside on a chip), crypto key selection and bindings can all be configured in a respective one of MRCs 134-138 and encoded in a MRC message on the bus transaction side channel signals that are provided to IEE 112 at the time the bus transaction arrives at IEE 112.

Address translations can be established for each domain and privilege level during configuration of IEE 112. MRCs 134-138 can be configured by a trusted execution environment but it is possible that spawned execution environments can claim memory regions (e.g., execution environments plus memory and peripheral resources, i.e., resource domains) and provide their own configurations. Alternatively, resources can be assigned by higher privileged processes. Note it is possible for a domain or privilege level to program a physical address that is not within its legal range (from a memory management perspective) so bounds checkers can be utilized. Instead of an address translator, MRCs 134-138 can be configured to attach additional address routing bits that steer the transaction through the fabric 114 to a selected IEE 112. Once the transaction arrives at the IEE 112 the additional address routing bits are removed. The IEE 112 processes the transaction and then forwards it to the original address.

Different encryption modes can be used for different use cases, and the chosen mode can be cryptographically bound to the data. Likewise, resource domain identifiers included in the bus transaction as user-defined bus attributes can be used for cryptographic key selection or be cryptographically bound to the data as well, to ensure data cannot be swapped externally and fetched by a source of a different resource domain. Other encryption modes can be used for storing data units larger than one block size, storing data units smaller than one block size, decrypt-only (read-only) data units, a streaming mode where there is no address binding but resource domain ID-based key selection remains. There can also be a binding where only the address and mode are included but not the resource domain, as can be used when data is shared among domains in a suitable memory device, such as double data rate (DDR) SDRAM.

In an alternate embodiment, domain identifier-aware access control (DIAC) modules 116-120 can be included to control access to memory devices 126, 130, 132 based on domain identifier, privileges, and location of the requested section of memory. Each of DIACs 116-120 can be configured to handle messages in a variety of communication protocols, such as protocols for the AXI, AHB or other suitable communication bus.

In the example shown, first DIAC module 116 is coupled between an output of switch fabric 114 and an input to DDR DRAM interface 122. A second DIAC module 118 is coupled between another output of switch fabric 114 and an input to OCRAM 126. A third DIAC module 120 is coupled between an output of switch fabric 114 and an input to QSPI 128. As many DIACs 116-120 as needed can be included with SOC 100.

MRCs 134-138 and DIACs 116-120 control access to memory devices 116-120. In addition, MRCs 134-138 associate contexts with transactions and attach a corresponding context to each transaction. If DIACs 116-120 are included, MRCs 134-138 are generally not required because DIACs 116-120 control access to memory devices 126, 130, 132. Similarly, if MRCs 134-138 are included, DIACs 116-120 may not be required, depending on the functionality implemented in the DIACs 116-120 and MRCs 134-138.

Figure 2:
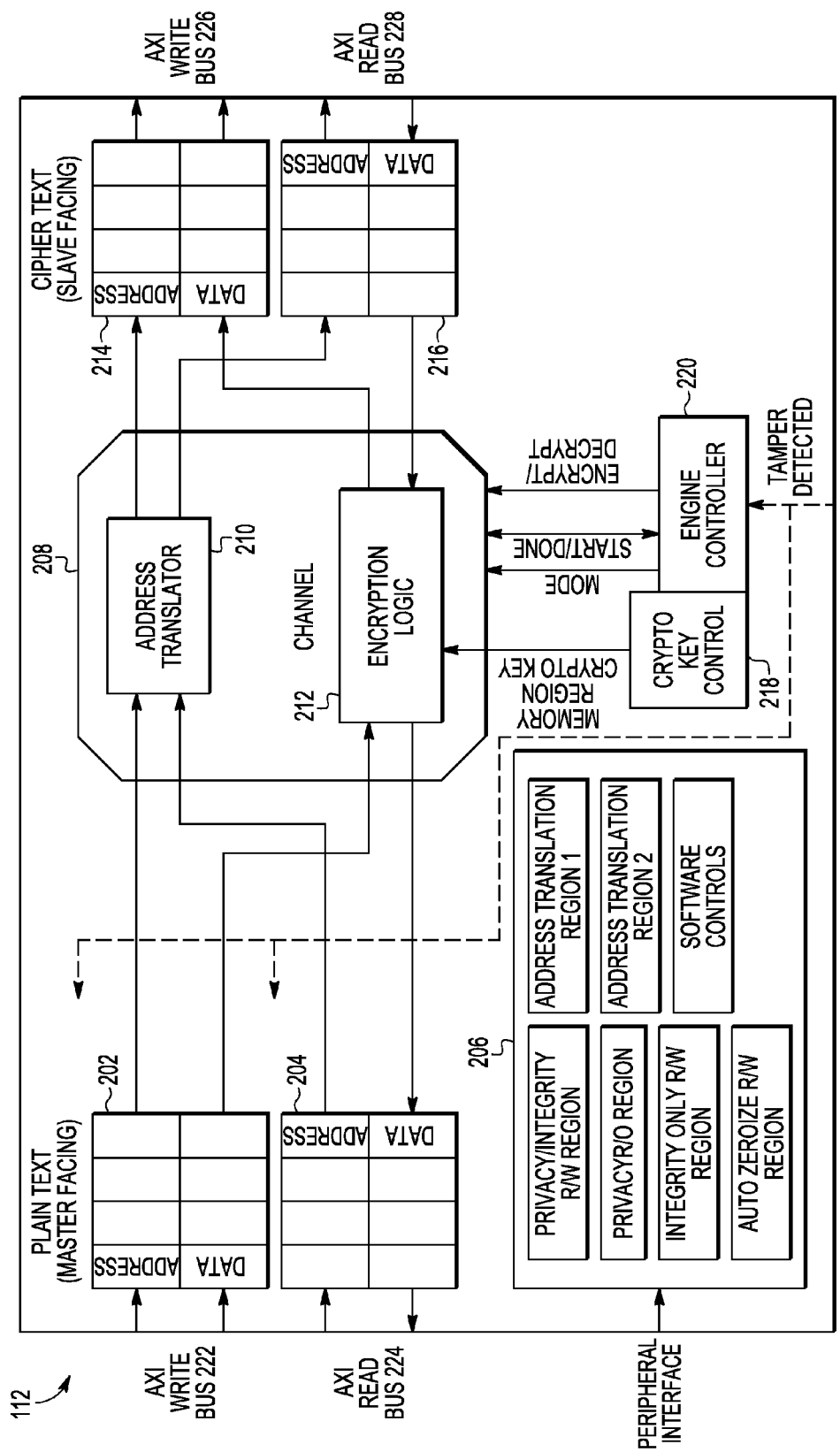
FIG. 2 is a block diagram of an embodiment of an inline encryption engine that can be used in the SOC of FIG. 1.

FIG. 2 is a block diagram of an embodiment of IEE 112 that can be used in the SOC 100 of FIG. 1 that includes registers or buffers 202, 204, 214, 216, channel unit 208 with address translator 210 and encryption logic 212, attribute information 206, cryptographic key control 218, and encryption engine controller 220.

Buffer 202 can be implemented as a FIFO buffer that includes a first input coupled to receive address information from write bus 222 and place the newest address information at the top of an address stack, a second input coupled to receive data from write bus 222 and place the newest data on the top of a data stack, a first output coupled to provide the address information at the bottom of the address stack to address translator 210, and a second output coupled provide the data at the bottom of the data stack to encryption logic 212. Write bus 222 is coupled to switch fabric 114.

Buffer 204 can be implemented as a FIFO buffer that includes a first input coupled to receive address information from read bus 224 and place the newest address information at the top of an address stack, a first output coupled to provide the address information at the bottom of the address stack to address translator 210, a second input coupled to receive data from encryption logic 212 and to place the newest data on the top of the data stack, and a second output to provide the oldest data on the bottom of the data stack to read bus 224. Read bus 224 is coupled to switch fabric 114.

Buffer 214 can be implemented as a FIFO buffer that includes a first input coupled to receive address information from address translator 210 and place the newest address information at the top of an address stack, a second input coupled to receive data from address translator 210 and place the newest data on the top of a data stack, a first output coupled to provide the address information at the bottom of the address stack to write bus 226, and a second output coupled provide the data at the bottom of the data stack to write bus 226. Write bus 226 is coupled to switch fabric 114.

Buffer 216 can be implemented as a FIFO buffer that includes a first input coupled to receive address information from read bus 228 and place the newest address information at the top of an address stack, a first output coupled to provide the address information at the bottom of the address stack to address translator 210, a second input coupled to receive data from encryption logic 212, and a second output to provide the oldest data on the bottom of the data stack to read bus 228. Read bus 228 is coupled to switch fabric 114.

Address translator 210 controls access to OCRAM 126, DRAM 130 and flash memory 132 by cores 102, 104, DMA interface 106, and I/O interface 108. Address translator 210 can map OCRAM 126, DRAM 130, flash memory 132 and the bus interface of cores 102, 104, DMA interface 106, and I/O interface 108 to corresponding memory addresses (e.g., virtual memory addresses) so that all accesses to the external devices are treated as a memory access. Address translations are established for each domain and privilege level during configuration of IEE 112.

Attribute information 206 can include security information for each component that accesses memory devices 126, 130, 132, such as cores 102, 104, a DMA unit (not shown) coupled to DMA interface 106, and I/O peripherals coupled to I/O interface 108. Such information can include privacy/integrity read/write regions, privacy read only regions, integrity only read/write regions, auto-zeroize read/write regions, address translation regions, and software controls that that limit and monitor access to programs and sensitive files that control the computer hardware and secure applications supported by SOC 100.

Cryptographic key control 218 can establish cryptographic keys and permissions. There may be long term keys that are stored in non-volatile memory such as flash memory 132 and ephemeral keys that are lost between power cycles or upon tamper. Non-volatile memories require a non-volatile key, while volatile memories such as DRAM 130 can use a random key generated for each power cycle.

Encryption engine controller 220 can set up encryption modes allowed for each region of memory devices 126, 130, 132. Regions for read/write access may use a particular mode of encryption based on a variety factors. The size of data units that can be protected by a key are specified by a standard, such as the National Institute of Standards and Technology publication entitled "Recommendation for Block Cipher Modes of Operation: The XTS-AES Mode for Confidentiality on Storage Devices", (U.S. Department of Commerce, NIST Special Publication 800-38E, January 2010). When data units are at least one block size, an instance of an AES-XTS encryption procedure, which is based on AES-XEX, can be used. When data units are smaller than a block size, another form of encryption can be used.

A number of bytes smaller than a block can be handled in another manner. For example, because a block cipher, such as AES, encrypts a fixed number of bytes in each block, if a sub-block (sparsely distributed bytes or contiguous bytes smaller than the number of bytes in a block) is written, a read-decrypt-modify-encrypt-write operation performed by IEE 112 can be used to handle the problem of uneven boundaries. The read-decrypt-modify-encrypt-write operation includes other data in the block encryption when the other data resides in memory around but within a block of the destination address of the sub-block-sized data. That is, all data in a block is encrypted in the read-decrypt-modify-encrypt-write operation even if only a small part of the block is specified to be encrypted. Encrypted data in the block that was not specified to be encrypted in the particular memory transaction will be re-encrypted along with all the rest of the data in the block. The encryption of any invalid data in the block does not affect the validity of the rest of the data in the block.

Regions of read-only memory may use still another encryption mode such as AES-CTR for efficient parallel key generation while data is fetched from a high latency memory.

Different encryption modes can be used for different purposes. Bus attributes can be cryptographically bound to the data to ensure data cannot be swapped externally and fetched by a source of a different privilege level.

The process of encryption and decryption is fairly transparent to cores 102, 104, peripherals, and memory devices 126, 130, 132 in that there is no setup and handling of the encryption process at the time that the data is stored or accessed. Interrupts are not generated from IEE 112 unless there is a fault.

A block encryption algorithm in encryption logic 212 can process a block of bits, such as 128 or other suitable number of bits, at a time. Data units in memory devices 126, 130, 132 may or may not be evenly divisible by the block size. In the case that a data unit is an even multiple of the block size then processing requires no additional steps. The data unit is encrypted according to the mode selected as n blocks of data where n=1, 2, 3, . . . and stored in the associated memory location. A data unit is the size or amount of data requested in a bus transaction. For read transactions, a multiple of AES blocks will be read from memory, decrypted, and the desired data extracted and returned as the resulting data for that bus transaction. When a write transaction is processed, if it is not the size of an AES block, then a read of the data will need to be performed, the data decrypted, the new data spliced into that data, re-encrypt the data, and finally write it back to memory. This is a costly operation so to prevent this, data may be pre-padded or packed to ensure data units are on even block boundaries if increased performance on small data units is required.

Figure 3:
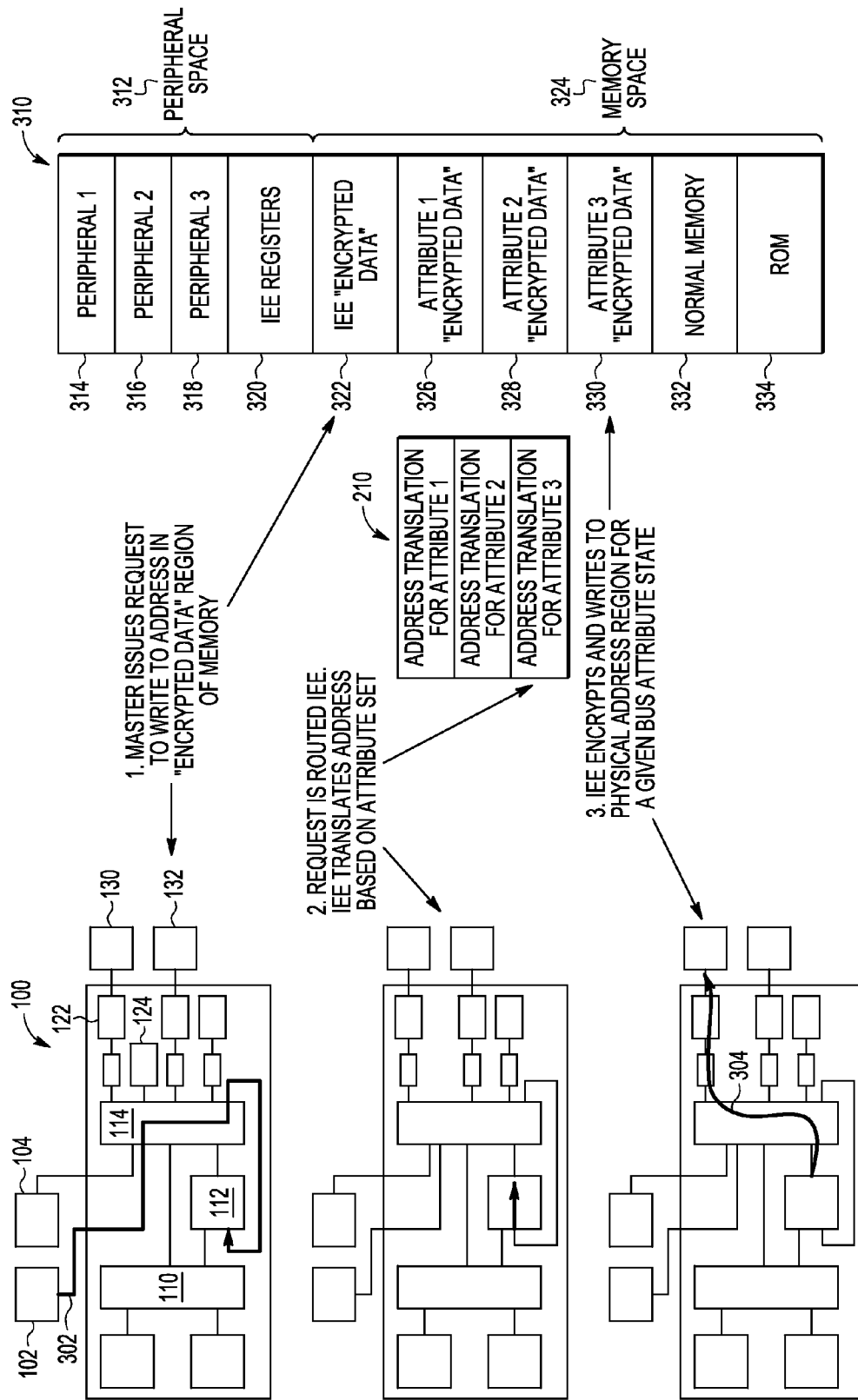
FIG. 3 is a block diagram showing a progressive path in the SOC of FIG. 1 of a request to write to an address in an encrypted data region.

Referring to FIGS. 1 and 3, FIG. 3 is a block diagram showing an example of paths 302, 304 in SOC 100 for a request to read from or write to an address in an encrypted data region of memory 130. To allow IEE 112 to intercept transactions from cores 102, 104 to an encrypted memory region, memory map 310 includes IEE encrypted data region 322 which identifies addresses in an encrypted area of memory 130. Switch fabric 114 directs the transaction to IEE 112 via path 302 when the original address matches an address in encrypted data region 322. Address translator 208 in IEE 112 then translates the address according to a corresponding bus attribute set in re-mapping tables 206. The data is encrypted by encryption logic 212 and forwarded to the actual destination memory location along path 304 from IEE 112 to switch fabric 114 to memory 130.

A single IEE 112 can be used for all memories in SOC 100, such as memory 130 and flash 132, instead of dedicating inline encryption engines for each memory interface. Having one IEE 112 serving multiple interfaces saves cost but requires a steering mechanism to direct all cipher-processed inline transactions to IEE 112 and then direct those transactions from IEE 112 to the intended destination. This steering mechanism can be handled using an extra address bus (shown for example by paths 302 and 304) that switch fabric 114 uses to route transactions to IEE 112 based on address. Note that switch fabric 114 can alternatively be configured to work with multiple IEEs 112, with each IEE 112 using different addresses.

Memory map 310 can include a first region 312 with information for software programming that is used to configure IEE 112 and a second region 324 that includes information to access encrypted data. In the example shown, region 312 of memory map 310 includes subsections or registers 314, 316, 318, 320 with information to configure 3 different peripherals and registers in IEE 112. The physical registers in the peripheral region 312 are common among all cores 102, 104. The peripheral register map can be fixed for all software to access. A second bus to the register set of IEE 112 can be used as a direct connection to a hardware key generator. For example, a cryptographic hardware accelerator may be used to decrypt blobs (or encrypted keys), and write the keys to the IEE key registers via a private bus. All key and configuration registers can be accessible on the primary bus, while only the key registers can be accessible on the private bus.

Section 324 of memory map 310 includes IEE encrypted data region 322, a variety of different attribute encrypted data regions 326, 328, 330, normal memory region 330, and read-only memory region 334. The encrypted memory regions will show up twice in the physical address space. Once for the raw encrypted data in region 322 that the IEE will access, and the decrypted physical address of normal memory 332 that the host processor will access. Bus transactions to this second physical address space will actually be directed to IEE 112 for processing. The encrypted data region 322 is used as the target address for each bus master or core 102, 104 that wants to access the encrypted memory region. The actual physical memory locations of the memory regions 322-334 may vary depending on IEE programming and bus attributes and addresses.

Regions 322-334 in memory map 310 are defined to be either encrypted or normal (unencrypted) using a configurable table (not shown) that can reside in memory region controllers (MRCs) 134-138 or accessed by MRCs 134-138 from a shared location. The configurable table can be shared with MRCs 134-138 for bounds checking of resource domains based on a domain identifier. When a bus address falls within one of the defined memory region boundaries defined as encrypted, an extra address bit can be set to indicate to fabric 114 that the request should be sent to IEE 112. An encryption Routing Table (ERT) can be included in MRCs 134-138 to define the memory regions that are to be encrypted, inform fabric 114 to route encryption transactions to IEE 112, and apply encryption attributes to the transaction such as which AES mode to use, which direction of encryption (write-encrypt or write-decrypt), and whether bus transaction attributes are to be bound to the cryptographic process or not.

IEE encryption attributes such as cipher mode, transaction-based identities and cipher direction, among others, can be defined per memory region and encryption mode. For instance, QSPI execute-in-place (XIP) decrypts in AES-CTR mode, "DDR Encryption" encrypts during write operations and decrypts during read operations in AES-XTS mode, and AES-ECB encrypts when reading from memory. Bus transaction attributes such as a domain identifier, trust zone, and address can be selected to be bound in the encryption process (for example, by using them to set the tweak value of AES-XTS), allowing for isolation between domains when transported to external devices. Since the encryption attributes are defined per region, they can be configured in the MRCs 134-138 and routed to IEE 112.

MRCs 134-138 define regions 314-334 based on physical address. Virtualized software entities in a run-time environment can use a hypervisor or base operating system to establish encrypted regions 322-330. Otherwise, encrypted regions 322-330 can be established ahead of time, such as during boot-up. For example, a request to configure encrypted regions 322-330 can be generated by operating systems in cores 102, 104 and stored in engine controller 220 (FIG. 2). An encryption routing table can be used to define memory regions that are to be encrypted, instruct fabric 114 to route encryption transactions to IEE 112, and apply encryption attributes to the transaction, such as which AES mode to use, which direction of encryption (write-encrypt or write-decrypt), and whether bus transaction attributes or to be bound to the cryptographic process or not. Table 1 shows an example of encryption attributes for four encryption domains that can be used in IEE 112.

TABLE 1

Example Encryption Attributes and Encodings

| AES Mode | Direction (FWD = Write-Encrypt, REV = Write-Decrypt) | Binds Address | 128 or 256 bits | Encryption Domain |
|---|---|---|---|---|
| XTS | FWD | Yes | 256 | 0, 1, 2, . . . 7 |
| CTR | FWD | Yes | 128 | 0, 1, 2, . . . 7 |
| XTS | FWD | Yes | 128 | 0, 1, 2, . . . 7 |
| ECB | REV | No | 128 | 0, 1, 2, . . . 7 |
| CTR | FWD | No | 128 | 0, 1, 2, . . . 7 |

Region Attribute Index and the Encryption Domain value can be sent as a relay message from MRCs 134-138 to IEE 112. The re-mapping can be done by adding an address offset to the input physical address to point IEE 112 to the aliased address of the raw encrypted data.

Figure 4:
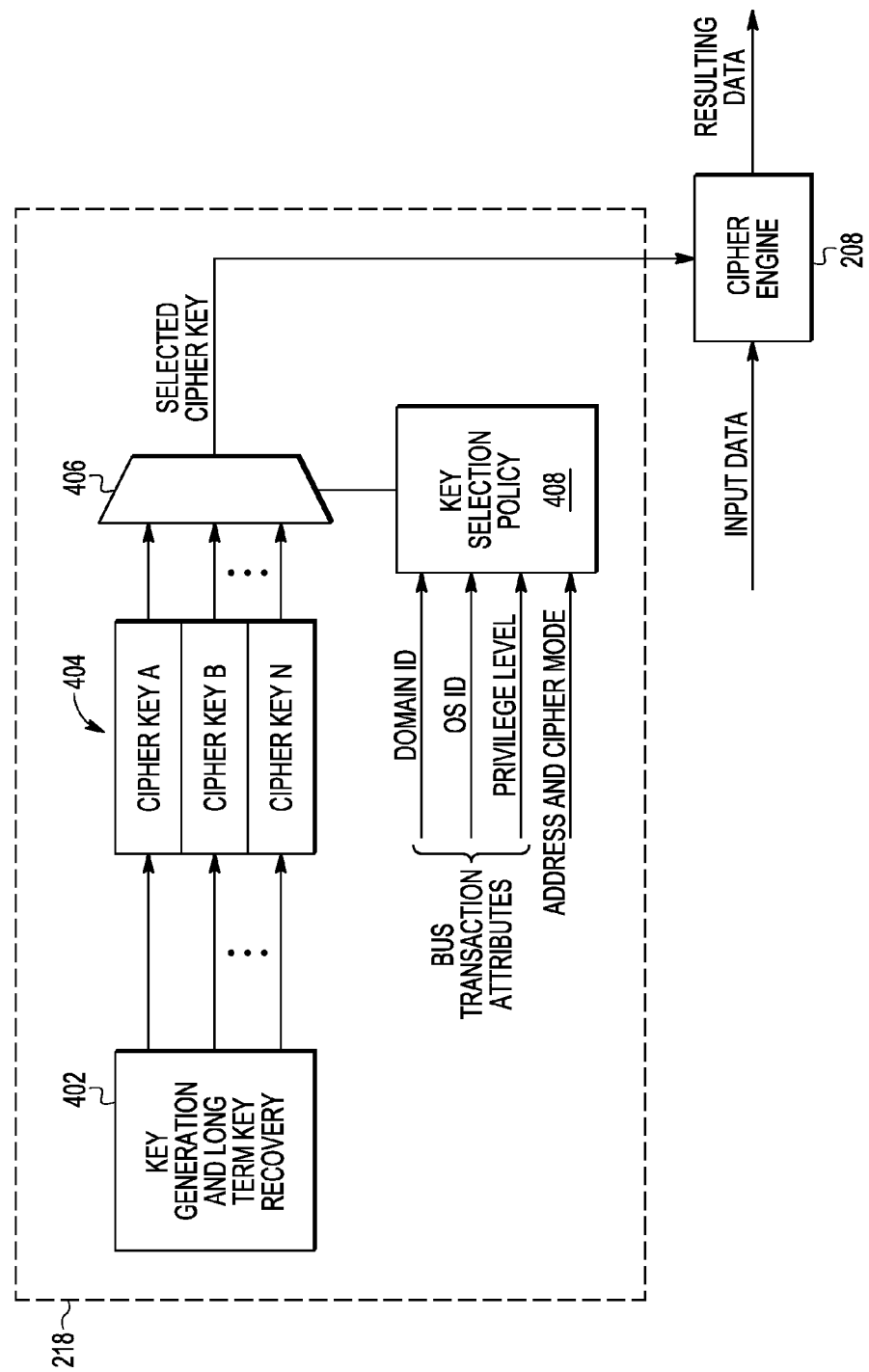
FIG. 4 is a block diagram showing an embodiment of components used in the crypto key controller in the inline encryption engine of FIG. 2.

FIG. 4 is a block diagram showing an embodiment of components used in crypto key controller 218 in IEE 112 of FIG. 2 including key generation and long term key recovery unit 402, cipher key storage unit 404, multiplexer 406, and key selection policy unit 408.

Key generation and long term key recovery unit 402 generates the security keys for the encryption modes being used. The keys may be used for decryption and encryption, or used solely for decryption or encryption, and may have various sizes, again depending on the cipher mode(s) being used.

Cipher key storage unit 404 is a register or buffer that stores cipher keys generated by key generation and long term key recovery unit 402. Cipher key storage unit 404 may include as many entries as are necessary to save keys for various domains and crypto codes being used in SOC 100.

Multiplexer 406 selects among the keys stored in cipher key storage unit 404 based on a control input from key selection policy unit 408, and provides the selected key to cipher engine 208 (FIG. 2). Key selection policy unit 408 uses attributes of the bus transaction or request such as domain identifier, operating system identifier, privilege level, address, and cipher mode, for example, to determine which key to select. The selected key is then used to decrypt/encrypt the data input to cipher engine 208. The resulting data from cipher engine 208 can be sent to the appropriate bus to fabric 114.

Memory mapped encrypted regions 322-330 can be defined as (read/write) RAN volatile, RAN non-volatile, and read only (RO) non-volatile and can be mapped to different domains. Pertinent attributes of domain and privilege mode for externally located memory can have different associated keys because external memory address lines or related signals can be easily modified. Keys for volatile memory regions may be discarded between power cycles while keys for non-volatile memory can be wrapped and securely stored in non-volatile storage, as well as unwrapped and stored in a protected key region in IEE 112. The crypto key can be automatically selected based on bus transaction controls and address. Key cache allows for pre-computation and storage of "attribute keys" for faster processing.

At the time of transaction, a key can be selected based on the targeted memory region 322-330, the bus privilege, and domain attributes. There may be different keys for the same memory region 322-330 depending on bus privilege attributes. If binding is selected then bus privileges, source domain, operating system process ID, security state, encryption mode and other attributes can be cryptographically bound to the key such that the same values can be present again to use the same key.

Some processing cores 102, 104 may have separate fields in the attribute identifier, not fully encoded, such that each field in the identifier gives indication of its origin. Other processing cores 102, 104 may encode the various attributes into a single identifier whereby the privilege and security information is incorporated but not directly determined from the identifier. This design supports both representations of identifier and state attribute information.

Figure 5:
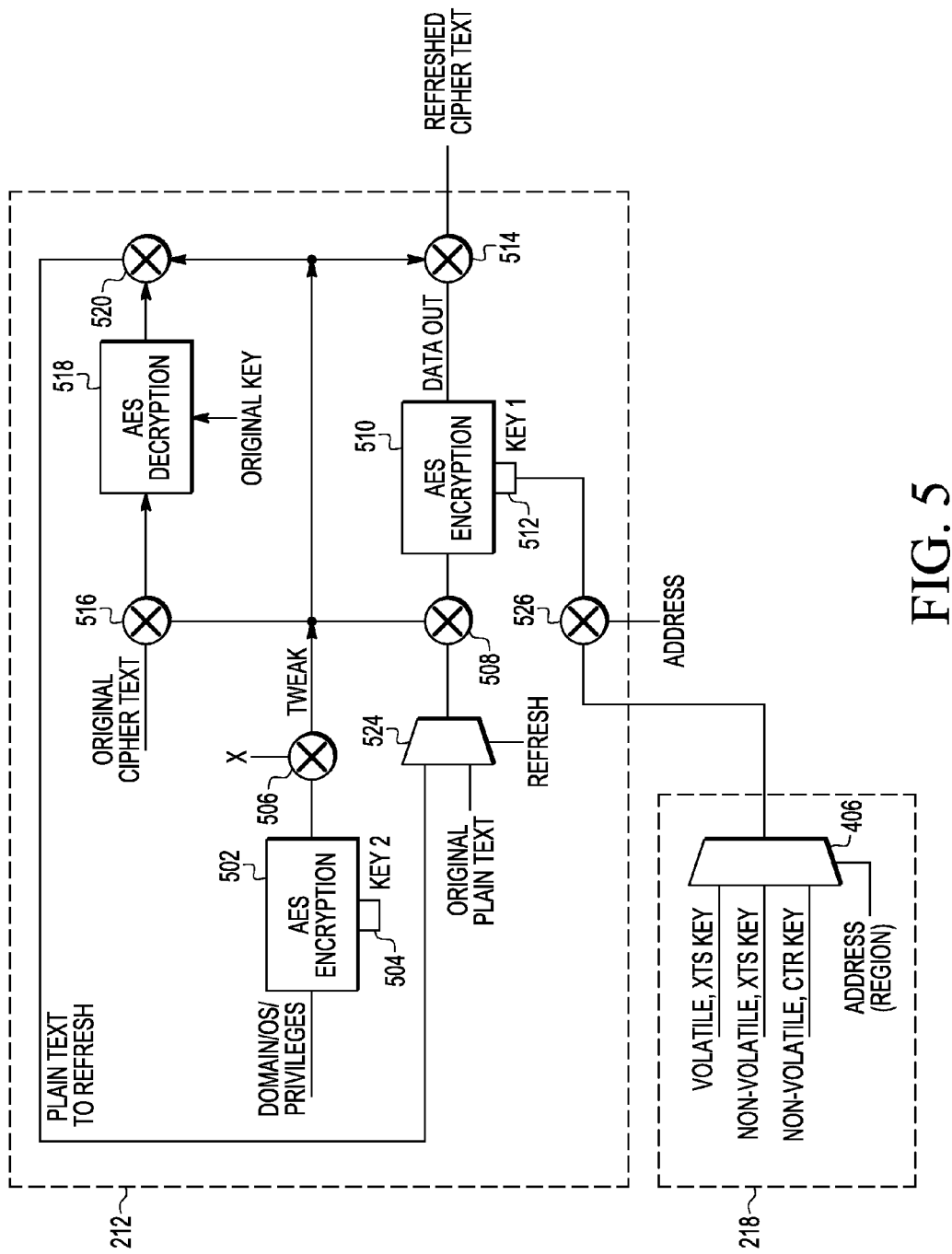
FIG. 5 is a block diagram showing an embodiment of components used in security key refresh in the SOC of FIG. 1.

FIG. 5 is a block diagram showing an embodiment of components used in encryption logic 212 and crypto key controller 218 of FIG. 2 that can be used to generate keys and automatically update keys for memory regions 322-330 in the background when a key's lifetime has expired. Multiplexer 406 has a control input based on the address of the memory regions 310 for which the transaction is requested. The control input selects a key from among multiple keys, such as a volatile XTS key, a non-volatile XTS key, and a non-volatile CTR key. Multiplexer 406 provides the selected key to combiner junction 526 where the selected key is combined with the address and provided to a port 512 of AES encryption unit 510. Another input to AES encryption unit 510 is provided by combiner unit 508, which combines either the original (unencrypted) plain text or an unencrypted version of plain text that is due for a key refresh, based on whether the key has expired, with a tweak factor that is used to refresh the key. AES encryption 510 encrypts the plaintext with the tweak, if there one, and provides the encrypted data to combiner 514. Another input to combiner 514 is the tweak value, thus allowing combiner 514 to provide both the encrypted data and the tweak factor as refreshed ciphertext to fabric 114.

The tweak factor is also provided to combiner 520. Another input to combiner 520 is decrypted data from AES decryption unit 518, which uses the original key to decrypt the original ciphertext combined with the tweak factor from combiner 516. The tweak factor is provided by combiner 506, which receives data from AES encryption unit 502 that is encrypted with a second key at port 504 and a value (xi) that is based on the address of the encrypted data.

IEE 112 allows for mode selection for a memory region 322-330, along with bus attributes and address. The mode can be made bound to the memory region, along with the bus attributes and address to ensure the security of the encrypted region 322-330 cannot be degraded by an unauthorized process after initial establishment of the encryption and associated parameters.

All IEE bus transactions to the raw encrypted data can be for multiples of an AES block size. This may be different from the requested data size.

Unlike mode AES-ECB, mode AES-XTS (for DDR storage) is a tweak-able block cipher that allows for variability in the encrypted data. Without variability, the same data using the same key would always encrypt to the same result, regardless of address or attributes.

For XTS-AES, for example, the cipher text is encrypted as follows (according to IEEE 1619-2007): C4←XTS-AES-blockEnc (Key, P, i, j), where Key is a 256 or 512 bit XTS-AES key; P is the 128-bit plaintext; i is a 128-bit tweak value; j is a sequential number of the 128-bit block inside the data unit; and C is the resulting 128-bit ciphertext.

The key is two 128-bit keys that are used in the AES encryption block in different stages. The first stage encrypts a value "i". In one implementation of IEE 112, this is the binding information including the bus attributes, byte address, and cipher mode. The result is multiplied in a Galois field using the sequential number corresponding to the data unit block. The first block of the data unit in the encryption is j=0; the next block is j=1, etc. The tweaked result is XOR'ed with the plaintext which is then encrypted with the other 128 bit key. The final result of the second stage is XOR'ed again with the result of the first block.

For AES-CTR mode, data is encrypted once using the same key and counter value. There is no restriction on the number of the reads with the same key and counter value. The address, mode, domain and bus privilege are bound into a counter value. A tweak key is not required for AES-CTR mode.

The throughput and latency of the engine allows execution from the QSPI 128 with virtually no noticeable impact. This can be achieved by using AES-CTR mode which encrypts the counter values while the QSPI 128 retrieves the data from flash memory 132. The encryption of the counter values can keep up with the maximum throughput of the QSPI access rate. Then the data from flash is XOR'ed with the encrypted counter values as it passes on to the bus to its destination. IEE 112 receives code fetches which are cached and executed at core 102, 104.

IEE 112 can provide an AES-ECB, AES-CTR, or other suitable mode for read-encryption/write-decryption to support I/O encrypted communication. DMA interface 106 reads data from memory that is un-encrypted which is routed through IEE 112 and then automatically encrypted with a key that is shared at the other end of the I/O channel. This key is associated with the memory region, an I/O buffer for instance. DMA interface 106 receives the encrypted data and sends it through a transmit channel. IEE 112 protects data communicated across SOCs 100 that use the same encryption context such as cryptographic key and counter mode value or resource domain mechanism and enumeration of resource domain space identifiers.

To replace or refresh an expiring key, a full read and re-write of the memory region associated with the expiring key is required along with a new key. The data in the associate memory region is decrypted with the old key and re-encrypted with the new key.

IEE 112 is capable of replacing long-term keys that may encrypt large amounts of data or have been resident and used in SOC 100 for a long period of time. In the key replacement mode, a new key is loaded in a replacement register for the memory region under the same bus privilege attributes as the original key and before locks set. Then the process of reading and decrypting the encrypted data from memory with the original key and then re-encrypting the data with the new key is performed. When the entire region is refreshed with the new key an interrupt is sent to the associated core 102, 104.

For attribute bound storage, and for selected encryption modes, the output of the first encryption block can be pre-generated to attempt to reduce latency. When the memory region is established for an attribute state, then a pre-tweak factor can be generated and stored. When a transaction occurs with the matching attributes or matching address, the pre-tweak factor can be selected.

A trusted process can generate and unwrap keys for use in IEE 112. Each key can correspond to a memory region 322-330 and bus privilege attributes. There may be multiple keys for each memory region 322-330.

Upon tamper detection, all buffered memory contents can be erased and access to registers 202, 204, 214, 216 (FIG. 2) blocked. Encryption keys can be immediately erased with an asynchronous reset to the key registers 404. The channel unit 208 can be halted when tampering is detected to prevent encryption of data with invalid keys. Bus transactions can be responded to with a bus error.

All keys can be cleared upon tamper or security violation detection. Static keys may be recoverable if a copy remains in non-volatile storage. If the non-volatile storage is not protected against unauthorized access then keys stored there can be encrypted with a protected key encryption key. A crypto key can be associated to the NS-bit of the ARM platform as one of the bus attributes so secure world transactions can be automatically encrypted with a Trust-Zone key. The bus attributes such as privilege level and security mode determine key selection but will also align with hardware firewall protections to prevent writing encrypted data to another user's memory.

Figure 6:
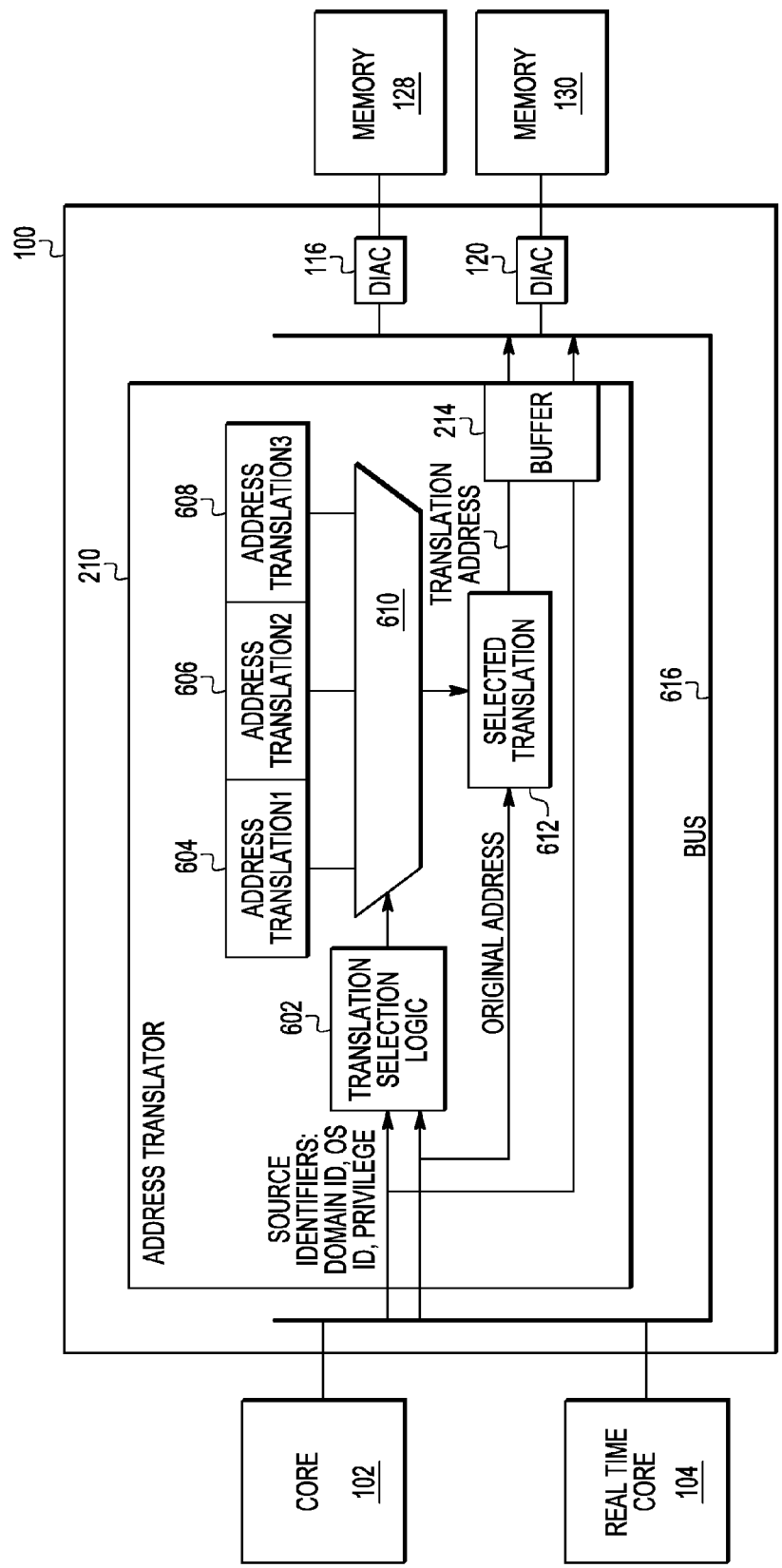
FIG. 6 is a block diagram showing an embodiment of components used in address translation in the SOC of FIG. 1.

FIG. 6 is a block diagram showing an embodiment of components used in address translation logic in address translator 210 of IEE 112 of FIG. 2 for I/O encrypted communication including translation selection logic 602, address translation registers 604, 606, 608, multiplexer 610, selected translation logic 612, and buffer 214. Translation selection logic 602 receives source identifiers such as domain identifiers, operating system identifiers, and privilege, along with original addresses from cores 102, 104 via communication bus 616. The source identifiers are also provided to buffer 214 while the original address is provided to selected translation logic 612. Address translation registers 604-608 store information that is used to translate the incoming address to physical addresses based on the source identifiers associated with the incoming address. Accordingly, translation selection logic 602 selects the appropriate address translation information from address translation registers 604-608 via multiplexer 610 based on the incoming address and the source identifiers. Selected translation logic 612 translates the incoming address according to the selected address translation information and provides the translated address to bus 616 via buffer 214. Bus 616 is coupled to DIACs 116, 118, 120, which are coupled to communicate with memory 128, 130 or peripheral devices (not shown).

Figure 7:
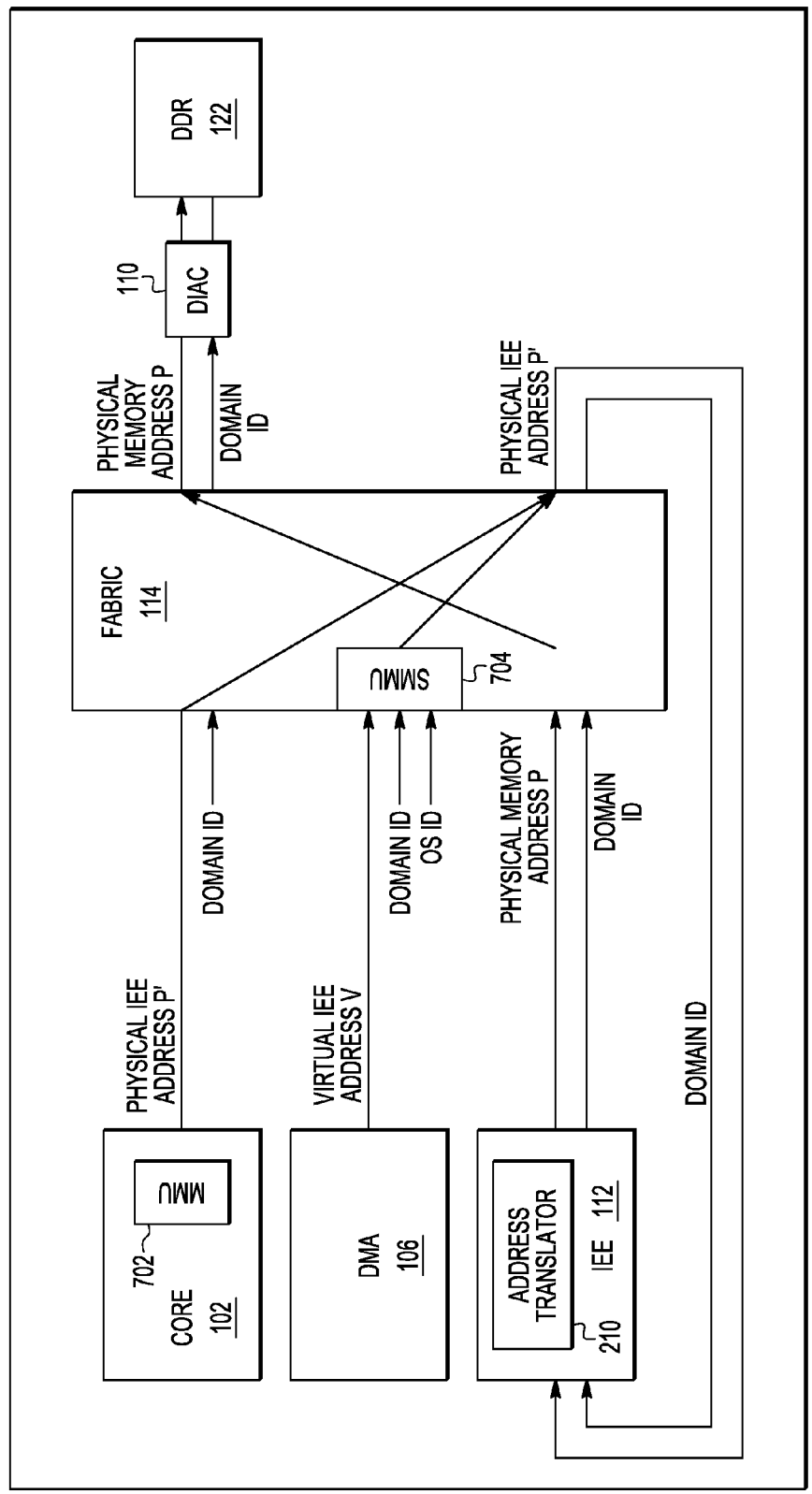
FIG. 7 is a block diagram showing an embodiment of components used to route data to be encrypted in the SOC of FIG. 1.

FIG. 7 is a block diagram showing an embodiment of components used to route data to be encrypted in SOC 100 of FIG. 1 including core 102 with MMU 702, DMA interface 106, IEE 112 with address translator 210, fabric 114, and DIAC 116. To distinguish addresses targeted for encrypted memory regions, one or more bits in the address can be set aside to use as an IEE indicator. For example, for addresses between '1000' and '0FF' can be targeted for encrypted memory regions and routed to IEE 112, while addresses between '0000' and '0FFF' can be targeted for unencrypted memory regions and do not need to be routed to IEE 112 by fabric 114. As examples of possibilities for routing addresses to IEE 112, or not, core 102 provides a physical IEE address and domain identifier to fabric 114, and since the physical address is an IEE address, fabric 114 routes the transaction to IEE 112. As another example, DMA 106 provides a virtual IEE address along with an operating system identifier and domain identifier to system memory management unit (SMMU) 704 in fabric 114. SMMU 704 translates the virtual IEE address to a physical IEE address and routes the transaction to IEE 112.

For transactions routed to IEE 112, IEE 112 provides the physical IEE address to address translator 210 in IEE 112, which translates the physical IEE address to a new physical memory address and provides the physical memory address fabric 114. The domain identifier is also provided to fabric 114, which in turn provides the physical memory address and domain identifier to DIAC 116 for the associated bus domain and privilege. DIAC 116 provides the physical memory address and domain identifier to a corresponding interface such as DDR 122 for output to memory 130 (FIG. 1).

Figure 8:
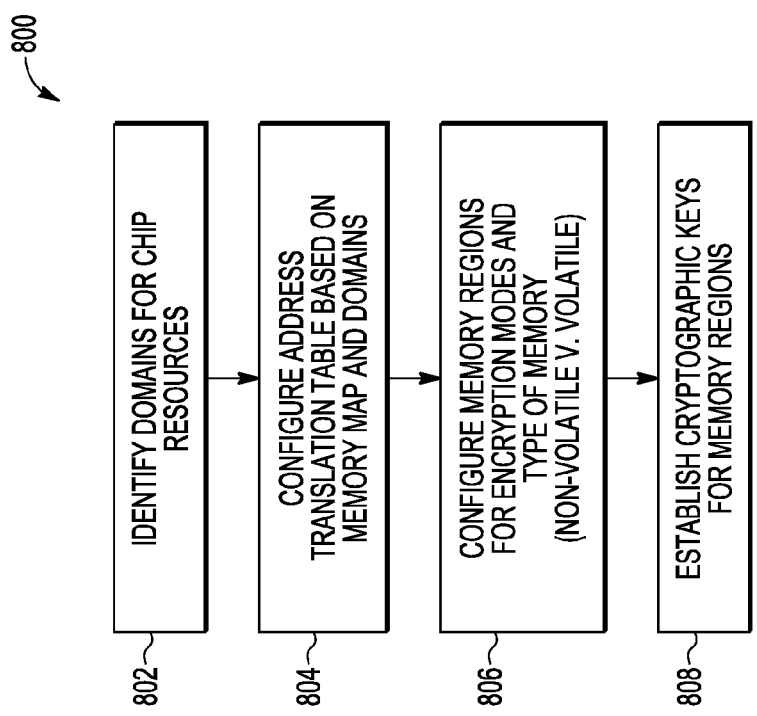
FIG. 8 is a flow diagram of an embodiment of a method for configuring data encryption features in the SOC of FIG. 1.

FIG. 8 is a flow diagram of an embodiment of a method 800 for configuring data encryption features in the SOC 100 of FIG. 1. Process 802 includes identifying domains for resources associated with the SOC 100. Resource domains can be created by assigning cores, bus masters, peripherals and memory regions to specific domains using domain identifiers. Integrity failure in one domain can be quarantined to prevent the effects of its corruption migrating to other domains. Specific regions in memory may be assigned to one domain or another or shared. Independent domains may have different privilege levels which may not correspond across domains. Domain-specific privilege levels control access to domain resources. Each domain determines its privilege level to access shared memory regions. Multiple processor cores may be incorporated within one domain. Each domain is assigned to a list in the peripheral and memory resource attributes. Bus masters and cores can be assigned to one of the domain identifiers. Memory resource controllers can support multiple regions, domains and R/W permissions.

Process 804 includes configuring address translation tables based on the memory map and domains identified in process 802. The address translation tables can be configured for different operating systems, peripherals, and memories (i.e., volatile and non-volatile). Process 806 includes configuring memory regions for various encryption modes and types of memory. For example, encryption modes may include various AES encryption modes or other suitable encryption modes.

Process 808 includes establishing cryptographic keys for the memory regions. In some embodiments, the crypto keys can be generated by crypto key control 218 (FIG. 2). Different keys for the same memory region may be generated or restored depending on bus privilege attributes. If binding is selected then bus privileges, source domain, OS process identifier, security state, encryption mode and other attributes can be cryptographically bound to the key. The keys generated may correspond to any suitable cryptographic system. Keys can be randomly generated using a random number generator, a pseudorandom number generator, a passphrase with a hash function, or other suitable technique.

In a block cipher mode, a block address is encrypted with a key to generate a corresponding keystream value. The keystream value is then XORed with encrypted data when the encrypted data arrives. For each context component, IEE 112 can pre-calculate and buffer keystream values by predicting what the next addresses will be. Commonly the next address is sequential to the present address and often bus transactions burst amounts of data larger than a block size such that more than one keystream value is needed in each burst.

In some cryptographic modes a counter value is incremented and encrypted to generate a corresponding keystream value which is then XORed with encrypted data when the encrypted data arrives. For each context component, IEE 112 can automatically increment and encrypt the counter value by requiring a block alignment in memory and then determining when byte addresses of the IEE transaction cross the block boundary. For each new block, the counter is automatically incremented. In this way an I/O buffer may be realized in the memory to allow AES-CTR streaming of I/O data from one device to another using inline encryption.

Figure 9:
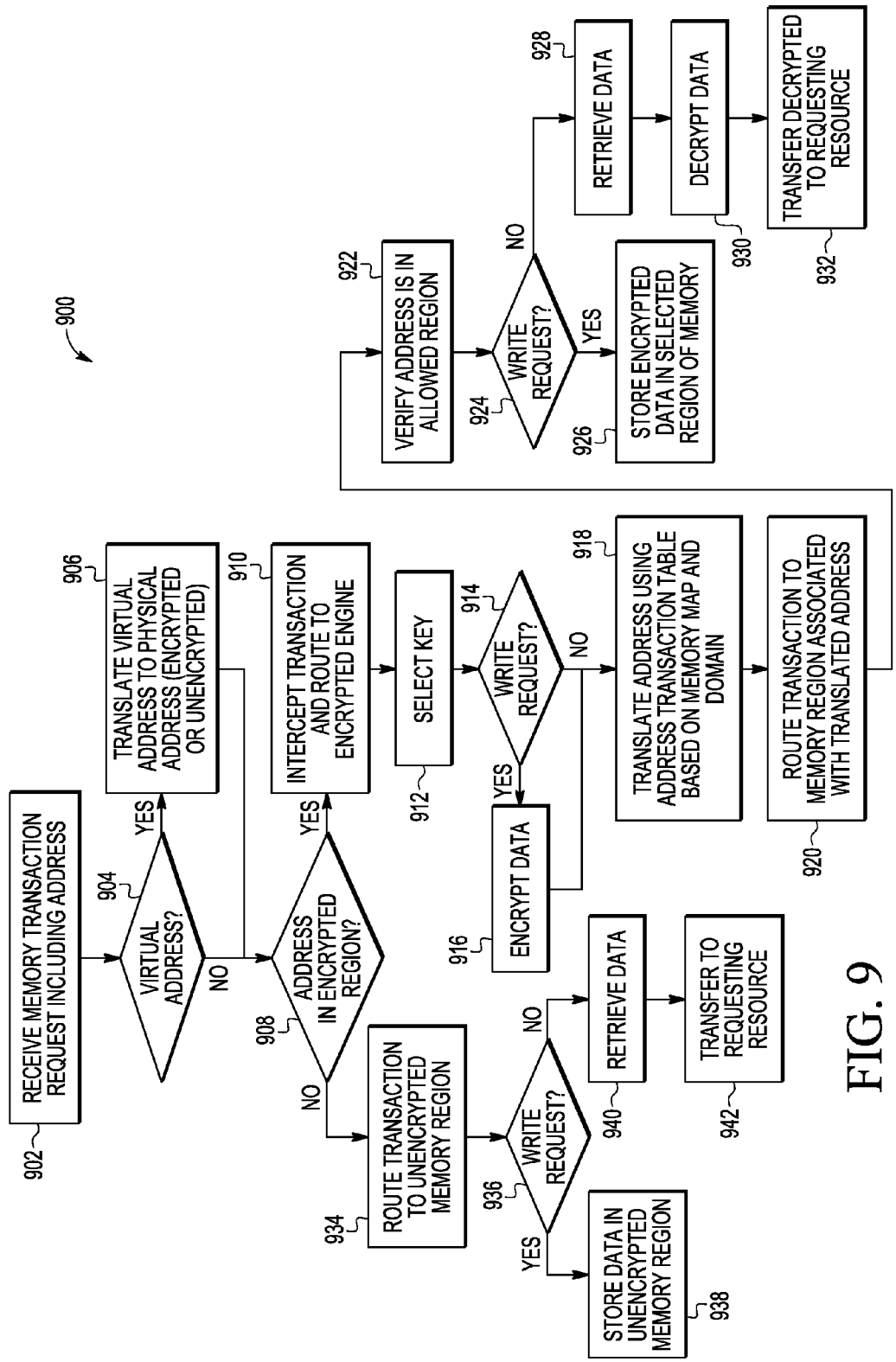
FIG. 9 is a flow diagram of an embodiment of a method for handling data encryption in the SOC of FIG. 1.

FIG. 9 is a flow diagram of an embodiment of a method 900 for handling data encryption in the SOC 100 of FIG. 1. Process 902 includes receiving a memory transaction request including context component, such as a domain identifier, an operating system identifier, an algorithm, an encryption mode, a crypto key, a physical or virtual address, a resource domain, a privilege and a security state. Although FIG. 9 shows an address being used as the context component, other context component can be used in method 900 in addition to, or instead of, the address. The request may also include a resource domain identifier, an operating system identifier, and other source identifying information or attributes.

Process 904 includes determining whether the incoming address is a virtual address that needs to be translated to a physical address. If the incoming address is a virtual address, process 906 translates the virtual address to a physical address for an encrypted or unencrypted region. A portion of the virtualized address can include an indicator of whether the resulting physical address is in an encrypted region, as well as to identify the region. If the incoming address is not a virtual address, or when the virtual address has already been translated, method 900 transitions to process 908 to determine whether the physical address is in an encrypted memory region. This determination in process 908 may be made by determining whether a portion of the address indicates that the address is in an encrypted region. For example, 4 bits of each address may be allocated to indicate that the address is in an encrypted region and to identify the region itself, with three of the bits being used to identify the region, one of the bits being used as the encryption indicator, and the rest of the address being used for the physical address itself.

If the address is in an encrypted region, process 910 routes the transaction request to the encryption engine. Process 912 includes selecting an encryption key based on bus attributes, domain identifier, address, and/or other information associated with the transaction request.

Process 914 determines whether the transaction request is a write request. If so, process 914 transitions to process 916 to encrypt the data using the key selected in process 912. After the data is encrypted, or if the transaction request is not a write request, method 900 transitions to process 918 to translate the address using the address translation table that is based on a memory map, such as memory map 310 of FIG. 3, of encrypted and unencrypted regions and resource domain attributes.

Process 920 then routes the transaction request to the memory region associated with the translated address. Process 922 verifies that the translated address is within an allowed encrypted memory region by checking address bounds, permissions, privileges and/or other suitable information. Process 924 determines whether the transaction request is a write request. If so, process 926 stores the encrypted data in the selected encrypted region of memory. If the transaction request is a read request (i.e., not a write request), method 900 transitions to process 928 to retrieve the data and process 930 decrypts the data. Process 932 transfers the decrypted data to the requesting resource.

Referring again to process 908, if the address is not in an encrypted memory region, process 934 routes the transaction request to an unencrypted memory region. Process 924 determines whether the transaction request is a write request. If so, process 938 stores the unencrypted data in the selected unencrypted region of memory. If the transaction request is a read request (i.e., not a write request), method 900 transitions from process 936 to process 940 to retrieve the data and process 942 transfers the unencrypted data to the requesting resource.

By now it should be appreciated that in some embodiments, there has been provided a method of encrypting data on a memory device (130, 132). The method can include associating a context component with a memory transaction request when a data component in the memory transaction request will be stored in an encrypted memory region, receiving the memory transaction request (902) at an inline encryption engine (112) coupled between a processing core (102) and switch fabric (114) in a system on a chip (SOC) (100), encrypting the data component according to the context component, and communicating the encrypted data component to a location in the encrypted memory region.

In another aspect, the context component can include at least one of a group consisting of: a resource domain identifier, an encryption algorithm, an encryption mode, a crypto key, an address, operating system, a privilege level, a counter value, a starting variable, an initialization vector, and a security state.

In another aspect, the method can further comprise encrypting the context component using at least a second key to generate a tweak; and encrypting the data component using at least the tweak and a first key.

In another aspect, the method can further comprise encrypting at least two addresses of data segments using the first key to generate a plurality of keystream values; storing the keystream values; and XOR-ing the keystream values with encrypted data, using a different one of keystream values for each segment of the encrypted data corresponding to one of the at least two addresses. (Key selector 218 in FIGS. 4 and 5). The first key can be selected from a plurality of keys using the context component.

In another aspect, the method can further comprise associating the context component with the memory transaction request prior to receiving the memory transaction request at the inline encryption engine, and determining which of a plurality of the inline encryption engines to route the memory transaction request and the context component based on at least one of a group consisting of: a resource domain identifier, an address, operating system, and a privilege level.

In another aspect, the method can further comprise prior to receiving the memory transaction request at the inline encryption engine, receiving the memory transaction request at the switching fabric, identifying whether the memory transaction request is associated with an unencrypted memory region (908), and if the memory transaction request is associated with the unencrypted memory region, routing the data component to a location in the unencrypted memory region (934).

In another aspect, the method can further comprise encrypting at least one counter value using the first key to generate a plurality of keystream values; storing the keystream values; and XOR-ing the keystream values with encrypted data, using a different one of keystream values for each segment of the encrypted data corresponding to one of the at least one counter.

In other embodiments, a semiconductor device comprising an inline encryption engine that can comprise an address translation component (210) operable to: receive an input (910) from a switching fabric (114), the input comprising an address component, a data component, and a domain identifier, wherein the domain identifier is associated with one of a plurality of domains; and translate the address component (918) based at least on the domain identifier, the translated address identifying a location in an encrypted memory region. An encryption engine (212) can be operable to identify a tweak (506) based at least on the domain identifier and a first encryption key (504), encrypt the data component (510) with at least: a second encryption key (512) and the tweak, and communicate the encrypted data component, the domain identifier, and the translated address (920) to the switching fabric (114).

In another aspect, the domain identifier is associated with a logical domain comprising a plurality of computing resources.

In another aspect, the second key is selected from a plurality of keys based on the address component (218).

In another aspect, the second key is selected based at least on an encryption mode selection and a memory type, wherein the memory type is associated with the encrypted memory region (218).

In another aspect, the encryption mode selection indicates one of a plurality of encryption modes, the plurality of encryption modes comprising a first mode for storing data units equal to one block size, a second mode for storing data units larger than one block size, a third mode for storing data units smaller than one block size, a fourth mode for decrypt-only data units, and a streaming mode (404).

In another aspect, the encryption engine is further operable to refresh the first key upon expiration of the first key and refresh the second key upon expiration of the second key (524).

In another aspect, the encryption engine is operable to identify the tweak by encrypting at least the domain identifier using at least the first encryption key (502).

In further embodiments, a semiconductor system on a chip (SOC 100) can comprise a processor core; a switching fabric (114) coupled to communicate with the processor core and a memory device; and an inline encryption engine (112) coupled to communicate with the switching fabric. The inline encryption engine can be configured to: receive an input (910) from the switching fabric, wherein the input is provided by the processor core, encrypt a data component in the input, and send an encrypted data component to the switching fabric (920), wherein the encrypted data component comprises the data component of the input encrypted with at least a first encryption key and a tweak (508, 510). The tweak can be based on at least one of a resource domain identifier, an address, a privilege level, a security state, and a second encryption key (502, 504). The switching fabric can be configured to send the encrypted output to a location in an encrypted memory region (926) in the memory device.

In another aspect, the inline encryption engine is further configured to perform a read-decrypt-modify-encrypt-write operation that encrypts all data in a block in which only a small part of the data in the block is specified to be encrypted.

In another aspect, the SOC can further comprise a memory resource controller (134-136) coupled to communicate with the processor core and the switch fabric, the memory resource controller is configured to determine whether a context component of the input from the processor core identifies a location in an encrypted memory region.

In another aspect, the memory resource controller can determine which of a plurality of the inline encryption engines to route the input based on at least one of a group consisting of: the resource domain identifier, the address, an operating system, and the privilege level, wherein at least some of the plurality of the inline encryption engines are different from one another.

In another aspect, the switching fabric can be further configured to, prior to communicating the input to the inline encryption engine: identify whether the context component is associated with an unencrypted memory region (508); and if the context component is associated with the unencrypted memory region, communicate the data component to a location in the unencrypted memory region (534).

In another aspect, the SOC can further comprise a domain identifier aware controller (116, 118, 120) coupled to communicate with the switch fabric and the memory device, the domain identifier aware controller is configured to determine whether a context component of the input from the processor core identifies a location in an encrypted memory region of the memory device.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of encrypting data on a memory device, the method comprising:
    associating, by a memory region controller, a context component with a memory transaction request when a data component in the memory transaction request will be stored in an encrypted memory region;
    receiving the memory transaction request at a switch fabric from a processing core via the memory region controller, wherein the switch fabric and the processing core are in a system on a chip (SOC);
    determining whether the data component is to be stored in the encrypted memory region or an unencrypted memory region;
    in response to determining that the data component is to be stored in the encrypted memory region:
        sending the memory transaction request from the switch fabric to an inline encryption engine in the SOC;
        encrypting the data component according to the context component including a domain identifier, wherein the domain identifier is associated with a logical domain comprising a plurality of computing resources;
        identifying a tweak based at least on the domain identifier and the encryption key;
        encrypting the data component with at least a first key and the tweak; and
        communicating the encrypted data component to a location in the encrypted memory region from the encryption engine to the switch fabric, and from the switch fabric to the encrypted memory region.

2. The method of claim 1, wherein the context component, from the memory region controller, further includes at least one of a group consisting of: an encryption algorithm, an encryption mode, an encryption key, an address, operating system, a privilege level, a counter value, a starting variable, an initialization vector, and a security state.

3. The method of claim 1, further comprising:
    encrypting the context component using at least a second key to generate the tweak.

4. The method of claim 3, wherein the first key is selected from a plurality of keys using the context component, the method further comprising:
    encrypting at least two addresses of data segments using the first key to generate a plurality of keystream values;
    storing the keystream values; and
    XOR-ing the keystream values with encrypted data, using a different one of keystream values for each segment of the encrypted data corresponding to one of the at least two addresses.

5. The method of claim 1, further comprising:
    associating the context component with the memory transaction request prior to receiving the memory transaction request at the inline encryption engine; and
    determining which of a plurality of inline encryption engines to route the memory transaction request and the context component based on at least one of a group consisting of: a resource domain identifier, an address, operating system, and a privilege level.

6. The method of claim 1, further comprising:
    in response to determining that the data component is to be stored in the unencrypted memory region, routing the data component to a location in the unencrypted memory region and bypassing the inline encryption engine.

7. The method of claim 3, further comprising:
    encrypting at least one counter value using the first key to generate a plurality of keystream values;
    storing the keystream values; and
    XOR-ing the keystream values with encrypted data, using a different one of keystream values for each segment of the encrypted data corresponding to one of the at least one counter.

8. A semiconductor device comprising:
    a hardware processor core;
    an inline encryption engine including, the inline encryption engine comprising:
        an address translation component configured to:
            receive an input from the switching fabric, wherein the input is provided to the switching fabric by the hardware processor core, the input comprising an address component, a data component, and a domain identifier, wherein the domain identifier identifies one of a plurality of isolated processing domains;
            translate the address component based at least on a first isolated processing domain identified by the domain identifier for the input, the translated address identifying a location in an encrypted memory region;
        an encryption engine configured to:
            identify an encryption key configured for the domain identifier and address component;
            encrypt the data component with the encryption key; and
            communicate the encrypted data component, the domain identifier, and the translated address to the switching fabric, wherein the domain identifier is associated with a logical domain comprising a plurality of computing resources;
            identify a tweak based at least on the domain identifier and the encryption key; and
            encrypt the data component with at least a second key and the tweak; and
    a switching fabric coupled to the hardware processor core, the switching fabric to determine whether the data component is to be stored in the encrypted memory region or in an unencrypted memory region, and in response to a determination that the data component is to be stored in the encrypted memory region, the switching fabric to provide the data component to the inline encryption engine.

9. The semiconductor device of claim 8, wherein the second encryption key is selected from a plurality of keys based on the address component.

10. The semiconductor device of claim 9, wherein the second key is selected based at least on an encryption mode selection and a memory type, wherein the memory type is associated with the encrypted memory region.

11. The semiconductor device of claim 10, wherein the encryption mode selection indicates one of a plurality of encryption modes, the plurality of encryption modes comprising a first mode for storing data units equal to one block size, a second mode for storing data units larger than one block size, a third mode for storing data units smaller than one block size, a fourth mode for decrypt-only data units, and a streaming mode.

12. The semiconductor device of claim 8, the encryption engine is further to refresh the first key upon expiration of the first key and refresh the second key upon expiration of the second key.

13. The semiconductor device of claim 8, the encryption engine is to identify the tweak by encrypting at least the domain identifier using at least the first encryption key.

14. A semiconductor system on a chip (SOC) comprising:
a processor core;
a memory device;
an inline encryption engine configured to:
receive an input from the switching fabric, wherein the input is provided by the processor core,
encrypt a data component in the input,
send an encrypted data component to the switching fabric, wherein the encrypted data component comprises the data component of the input encrypted with at least a first encryption key that is configured for at least one of a resource domain identifier, an address, a privilege level, a security state, and a second encryption key, wherein the resource domain identifier identifies one of a plurality of isolated processing domains, wherein the resource domain identifier is associated with a logical domain comprising a plurality of computing resources,
identify a tweak based at least on the domain identifier and the encryption key, and
encrypt the data component with at least a second key and the tweak; and
a switching fabric coupled to the processor core and to the inline encryption engine, the switching fabric to determine whether the data component is to be stored in the encrypted memory region or in an unencrypted memory region, and in response to a determination that the data component is to be stored in the encrypted memory region for a first isolated processing domain identified by the resource domain identifier, the switching fabric to provide the data component to the inline encryption engine.

15. The SOC of claim 14, wherein the inline encryption engine is further configured to perform a read-decrypt-modify-encrypt-write operation that encrypts all data in a block in which only a small part of the data in the block is specified to be encrypted.

16. The SOC of claim 14, further comprising:
a memory resource controller coupled to communicate with the processor core and the switch fabric, the memory resource controller is configured to determine whether a context component of the input from the processor core identifies a location in an encrypted memory region.

17. The SOC of claim 16, wherein the memory resource controller determines which of a plurality of the inline encryption engines to route the input based on at least one of a group consisting of: the resource domain identifier, the address, an operating system, and the privilege level, wherein at least some of the plurality of the inline encryption engines are different from one another.

18. The SOC of claim 17, further comprising:
a domain identifier aware controller coupled to communicate with the switch fabric and the memory device, the domain identifier aware controller is configured to determine whether a context component of the input from the processor core identifies a location in an encrypted memory region of the memory device.

19. The SOC of claim 14, wherein the switching fabric is further configured to:
in response to a determination that the data component is to be stored in the unencrypted memory region, to communicate the data component to a location in the unencrypted memory region and to bypass the inline encryption engine.

* * * * *